US009436400B2

(12) United States Patent
Abzarian et al.

(10) Patent No.: US 9,436,400 B2
(45) Date of Patent: *Sep. 6, 2016

(54) TRANSIENT STORAGE DEVICE CONFIGURATION SILO

(71) Applicant: Microsoft Corporation, Redmond, WA (US)

(72) Inventors: David Abzarian, Kirkland, WA (US); Harish S. Kulkarni, Redmond, WA (US); Todd Carpenter, Monroe, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/589,875

(22) Filed: Jan. 5, 2015

(65) Prior Publication Data
US 2015/0193165 A1 Jul. 9, 2015

Related U.S. Application Data

(63) Continuation of application No. 12/356,055, filed on Jan. 19, 2009, now Pat. No. 8,930,655.

(51) Int. Cl.
G06F 3/06 (2006.01)
G06F 21/31 (2013.01)
G06F 21/78 (2013.01)

(52) U.S. Cl.
CPC ........... *G06F 3/0622* (2013.01); *G06F 3/0637* (2013.01); *G06F 3/0673* (2013.01); *G06F 21/31* (2013.01); *G06F 21/78* (2013.01); *G06F 2221/2129* (2013.01)

(58) Field of Classification Search
CPC .... G06F 21/78; G06F 3/0673; G06F 3/0622; G06F 3/0637; G06F 2221/2129; G06F 21/31
See application file for complete search history.

(56) References Cited

U.S. PATENT DOCUMENTS 7,120,433 B2 10/2006 Gladwin et al.
7,200,756 B2 4/2007 Griffin et al.
(Continued)

OTHER PUBLICATIONS

Donald Rich, "Authentication in Transient Storage Device Attachments", Computer, vol. 40, No. 4, pp. 102-104, Apr. 2007.*
(Continued)

*Primary Examiner* — Saleh Najjar
*Assistant Examiner* — Oleg Korsak
(74) *Attorney, Agent, or Firm* — Dan Choi; Sunah Lee; Micky Minhas

(57) ABSTRACT

A device configuration silo is arranged to be accessed as an IEEE 1667-compatible silo which exposes interfaces to a host application to make changes to the presence of one or more other silos, as well as make changes to silo configurations on a per-silo basis for data and method sharing among silos across the ACTs on a storage device such as a transient storage device. The interfaces exposed by the device configuration silo are arranged to enable an authenticated provisioner, like administrator in a corporate network environment, to perform configuration changes to silos after the storage device is released into the field through a secure provisioning mechanism. In addition, users may make configuration changes to silos at runtime in some usage scenarios, for example to enable discrete portions of functionality on a storage device, by using a secure secondary authentication mechanism that is exposed by the device configuration silo.

20 Claims, 9 Drawing Sheets

(56) References Cited

U.S. PATENT DOCUMENTS

| | | |
|---|---|---|
| 7,447,896 B2 | 11/2008 | Smith et al. |
| 7,634,548 B2 | 12/2009 | Graziado et al. |
| 7,669,770 B2 | 3/2010 | Wheeler et al. |
| 7,793,112 B2 | 9/2010 | Carpentier et al. |
| 2005/0021935 A1 | 1/2005 | Schillings et al. |
| 2005/0108707 A1 | 5/2005 | Taylor et al. |
| 2006/0129576 A1 | 6/2006 | Carpentier et al. |
| 2006/0224623 A1 | 10/2006 | Graziadio et al. |
| 2006/0224736 A1 | 10/2006 | Graziado et al. |
| 2006/0277205 A1 | 12/2006 | Song et al. |
| 2007/0134068 A1 | 6/2007 | Smith et al. |
| 2007/0136356 A1 | 6/2007 | Smith et al. |
| 2008/0059743 A1* | 3/2008 | Bychkov ............ G06F 21/305 711/163 |
| 2008/0109466 A1 | 5/2008 | Havens et al. |
| 2008/0133269 A1 | 6/2008 | Ching |
| 2008/0248779 A1 | 10/2008 | Tsui et al. |
| 2009/0006261 A1 | 1/2009 | Bernstein et al. |
| 2009/0164779 A1 | 6/2009 | Yan et al. |
| 2009/0307451 A1 | 12/2009 | Abzarian et al. |
| 2009/0327634 A1 | 12/2009 | Bovee |
| 2009/0328196 A1 | 12/2009 | Bovee |
| 2010/0017809 A1* | 1/2010 | Bryant-Rich ......... G06F 9/4411 719/327 |
| 2010/0169395 A1 | 7/2010 | Bryant-Rich et al. |
| 2011/0178930 A1 | 7/2011 | Scheidt et al. |

OTHER PUBLICATIONS

IEEE, IEEE Standard Protocol for Authentication in Host Attachments of Transient Storage Devices, Jun. 6, 2007, p. iv.

Donald Rich, Authentication in Transient Storage Device Attachments, Apr. 2007, http://www.computer.org.

"Legato NetWorker Installation Guide", Retrieved at<<http://rcswww.urz.tu-dresden.de/~polnickr/backup/clients/docs/ntig.pdf>>, Jan. 1999, pp. 38.

"Jan. 19, 2007 1667 Silo Type Identifier Tutorial", Retrieved at<<http://grouper.ieee.org/groups/1667/stid/Silo_Type_identifier_tutorial_2007_01_19.doc>>, pp. 3.

"Chapter 10 Silo Support Module ", Retrieved at<<htlp://docs.sun.com/app/docs/doc/805-3795/6j3jtvjod?I=ru&a=view>>, Jul. 28, 2008, pp. 8.

U.S. Appl. No. 12/356,055, filed Jan. 19, 2009, Abzarian.

* cited by examiner

Host stack

Device stack

| | $C_1$ | $C_2$ | $C_3$ | $C_4$ | $C_5$ | $C_N$ |
|---|---|---|---|---|---|---|
| | LUN # | ACT | Device configuration silo | Probe silo | Silo X | Silo Y |
| $R_1$ | 0 | Yes | Yes | Yes | Yes | Yes |
| $R_2$ | 1 | No | N/A | N/A | N/A | N/A |
| $R_N$ | 2 | Yes | No | Yes | Yes | No |

| | $C_1$ | $C_2$ |
|---|---|---|
| | Silo | Segregated |
| $R_1$ | Silo X | Yes |
| $R_2$ | Silo Y | No |
| $R_N$ | Silo Z | Yes |

| | $C_1$ | $C_2$ | $C_3$ |
|---|---|---|---|
| | Silo | Credential | Enabled |
| $R_1$ | Silo X | Asymmetric key | No |
| $R_2$ | Silo Y | Asymmetric key | Yes |
| $R_3$ | Silo Z | Password | No |
| $R_N$ | Silo Q | None | N/A |

TRANSIENT STORAGE DEVICE CONFIGURATION SILO

RELATED APPLICATION(S)

This application is a Continuation of, and claims benefit from, U.S. patent application Ser. No. 12/356,055 that was filed on Jan. 19, 2009, and that is incorporated herein by reference in its entirety.

BACKGROUND

The wide availability of storage devices including transient storage devices ("TSDs") such as flash drives, personal media players, digital cameras, portable external hard disk drives, mobile phones, and the like have provided both home and corporate users with a convenient way to copy data and transport files. TSDs can typically be coupled or mounted to host PCs (personal computers) using communication protocols and interfaces such as USB (Universal Serial Bus). These TSD devices serve much of the same functionality as older mass storage media such as floppy and optical disks but with vastly increased storage capacity with improved reliability at very low cost. Indeed, as TSD capacity continues to increase, the devices can function as containers not only for data, but for applications, or even complete virtual desktops in some cases. TSDs are also being deployed with multiple logical unit numbers ("LUNs") per physical device where each logical unit behaves like a totally separate device in order to provide even greater functionality and flexibility for users.

Although TSDs provide great convenience and functionality, they can also pose a significant security vulnerability that can make data vulnerable to loss or theft. Not only is it easy to lose a small flash drive on which valuable data is stored, for example, but an unauthorized person can easily connect a USB disk drive or other TSD to an unattended host PC (personal computer) and copy large amounts of sensitive data and/or personal information in a relatively short period of time. In addition, TSDs can have the potential to transport viruses or other malicious software which can then infect the host.

One solution to improve the security of TSDs is provided by IEEE (Institute of Electrical and Electronic Engineers) 1667 "Standard Protocol for Authentication in Host Attachments of Transient Storage Devices." IEEE 1667 provides a standardized methodology for authenticating TSDs when they are mounted to a host PC. By implementing authentication as specified by the standard, it becomes possible to enhance security and substantially reduce the vulnerability presented by TSDs across a variety of different computing platform and device types. For example, an IT (information technology) administrator in a business enterprise can create an approved set of TSDs that may be authenticated and used by the PCs on the corporate network ("corpnet") while preventing the use of unapproved rogue devices to thereby keep the enterprise secure. And both home and corporate users can benefit by using IEEE 1667-compliant TSDs to restrict the hosts on which the TSDs will work to reduce the potential for sensitive or personal data becoming compromised if the TSD is lost or stolen.

The IEEE 1667 standard is designed to be extensible and may support a variety of functionalities on a TSD through an architecture that can expose multiple functional units termed "silos." A silo is a uniquely addressable receiver of commands and one or more silos can exist in a storage area called an "addressable command target" ("ACT") on a device. ACTs and LUNs have a one-to-one relationship so there is one ACT per LUN. Several specialized silos are used in IEEE 1667 including an authentication silo that provides the functions required for bidirectional authentication and administration of the authentication certificates on the TSD. A probe silo lets the host application query the ACT for its functionality. The IEEE 1667 standard allows up to 254 additional silos in each ACT that can support a variety of non-IEEE 1667 functionalities (for a total of 256 silos) and multiple ACTs/LUNs can be supported on a single TSD.

While TSDs and hosts that implement IEEE 1667 can provide satisfactory results in many applications, the standard does not provide for changes to be made to silo configuration or availability after a TSD is released by its manufacturer to customers. That is, control over the configuration of the TSD is in the hands of the manufacturer and customers have no current ability to make configuration changes when a TSD is deployed in the field at runtime.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A device configuration silo is arranged to be accessed as an IEEE 1667-compatible silo which exposes interfaces to a host application to make changes to the presence of one or more other silos, as well as make changes to silo configurations on a per-silo basis for data and method sharing among silos across the ACTs on a storage device which may comprise TSDs and non-TSD devices. The interfaces exposed by the device configuration silo are arranged to enable an authenticated provisioner, such as an IT administrator in a corpnet environment, to perform configuration changes to silos after the storage device is released into the field through a secure provisioning mechanism. In addition, users, such as corporate or home users, may make configuration changes to silos at runtime in some usage scenarios, for example to enable discrete portions of functionality on a storage device, by using a secure secondary authentication mechanism that is exposed by the device configuration silo.

In various illustrative examples, the device configuration silo may be implemented on at least one ACT on a TSD. The device configuration silo will have awareness of all the silos that are initially provisioned on the TSD from the manufacturer or which may be added through later firmware updates. The device configuration silo will expose the interfaces to enable a variety of administrative actions to be performed including, for example, setting the authentication and secondary authentication provisioning mechanisms, performing authentication, configuring data and method sharing, and enumerating the silos and their configuration state.

The interfaces exposed by the device configuration silo further enable an authenticated provisioner to enable a given silo to be addressable on a given ACT to thus have presence so that its functionality can be utilized. In some implementations, an authenticated provisioner may also interface with the device configuration silo to set a sharing model under which a silo is "segregated," so that it will store data and methods on a per-ACT basis, or is unsegregated so that the same view of data and methods will be exposed regardless of the ACT from which a silo is accessed. A provisioner may be authenticated using various types of credentials including asymmetric key, symmetric key, password, biometric input, token, or other credential, for example.

If a silo requires secondary authentication before its presence and/or segregation status is configured on a TSD at runtime, then an additional authentication credential can be provided using the host application. For example, a TSD user may wish to activate some functionality that is pre-loaded in a silo on a TSD but not enabled until a user obtains a license key, activation code, product code, or the like that can be used as a secondary authentication credential. In some cases, the results of the secondary authentication can be persisted for all subsequent reconfigurations of the silo, while in others a secondary authentication will need to be performed for each and every subsequent configuration change.

A user may provide secondary authentication credentials which can be of different types including, for example, asymmetric key, symmetric key, password, biometric input, token, or other credentials. Secondary authentication can be performed locally between the host and the device. In addition, a remote server may also be utilized to supply a secondary authentication credential over a network connection to the host application, for example, when the user obtains or renews a license from an on-line service.

The device configuration silo may be implemented as a standalone silo that is configured to fit between the other silos in an ACT and the IEEE 1667 command processor so that new configuration functionality can be made available to the processor. In alternative embodiments, the current IEEE 1667 probe silo can be extended to integrate the functionality provided by the device configuration silo.

Advantageously, the present device configuration silo can significantly enhance the features and functionalities provided by IEEE 1667-compliant storage device implementations by enabling silos to be dynamically configured in the field at runtime. Such configuration flexibility enables a storage device to be readily tailored to a given usage profile by making different silos available as needed and restricting certain data and methods to particular ACTs/LUNs while sharing certain data and methods between others. In addition, storage device providers may also gain an effective distribution container for functionality such as software applications, data, media content, games, user experiences, and the like that can be pre-loaded on a storage device but not accessed until a user has obtained a license to use the functionality. Such container can enable new licensed-use business and revenue models to be implemented where licensed functionality can be securely controlled on the storage device but readily accessed by users with the appropriate secondary authentication credential.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

FIG. 10 shows an illustrative table which represents a data structure that is maintained by the device configuration silo for storing sharing model configurations;

FIG. 11 shows an illustrative table which represents a data structure that is maintained by the device configuration silo for storing secondary authentication provisioning data;

Like reference numerals indicate like elements in the drawings. Elements are not drawn to scale unless otherwise indicated.

DETAILED DESCRIPTION

Figure 1:
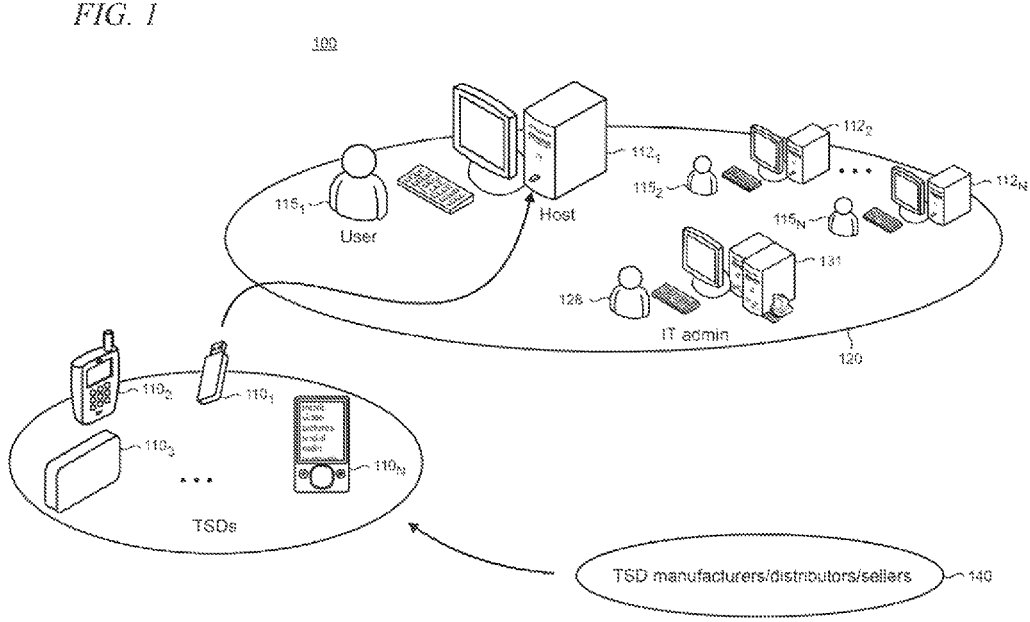
FIG. 1 shows an illustrative computing environment in which the present device configuration silo may be utilized.

FIG. 1 shows an illustrative computing environment 100 in which the present device configuration silo may be utilized. The computing environment 100 includes one or more TSDs $110_{1, 2 \ldots N}$ which may interface with a host device $112_1$ that is employed by a user $115_1$ in a usage environment 120. In this particular example, the usage environment 120 comprises a business enterprise which includes other host devices 112 and users 115 that communicate over an internal corpnet that is administered by an IT admin (administrator) 128 working at an admin console 131. However, it is emphasized that the present device configuration silo is not limited to business applications and that consumer users and host devices in home or school environments, for example, may also be supported.

The host devices 112 can include PCs, servers, workstations, laptop computers, game consoles, mobile phones, and other similar devices that can support the host-side requirements of IEEE 1667. These requirements include, for example, the ability to support public key infrastructure ("PKI") and a certificate store.

The TSDs 110 in this illustrative example are representative of the variety of devices that can be configured to be compliant with IEEE 1667 and include a USB flash drive $110_1$, a mobile phone $110_2$ having some mass storage functionality, a portable hard drive $110_3$, and a personal media player $110_N$ such as an MP3 (Moving Pictures Expert Group, MPEG-1, audio layer 3) player. The TSDs 110 shown are intended to be illustrative and other devices may also be utilized to meet the needs of a particular implementation. A TSD 110 will typically be directly operatively attached or mounted to a host device 112 through a physical interface and associated protocol such as USB. However, point-to-point wireless connectivity and protocols such as wireless USB ("WUSB") may also be utilized in some implementations. As shown in FIG. 1, the USB flash drive $110_1$ is configured to plug into a corresponding USB port in the host device $112_1$. The other TSD devices typically interface with the host using a cable (not shown) to connect to the USB port.

While TSDs 110 are shown in FIG. 1, it is emphasized that the present device configuration silo may also be utilized with non-TSD devices that implement functionalities that are compliant with IEEE 1667 or which have some TSD-like capabilities. That is, storage devices that do not embody transient features or portability may still be configured, in some implementations, to expose features and capabilities that are otherwise similar to IEEE 1667-compliant TSDs, such as ACTs and silos (as described in more detail below). When arranged with a device configuration silo, such storage devices can support significant functionality in non-transient usage scenarios and, accordingly, the present device configuration silo should not be viewed as being limited to only TSDs.

A TSD manufacturer, distributor, or seller (collectively identified by reference numeral 140) will typically supply the TSDs 110 into the enterprise usage environment 120. Under current practices, the configuration of the TSDs is provisioned by the manufacturer 140 and would thus be immutable to subsequent changes once received and deployed in the enterprise usage environment 120. In other words, the functionality and availability of silos on the TSD, and which ACTs will implement which silos, are determined at the time of TSD manufacture. By comparison, utilization of the present device configuration silo enables the configuration to be changed in the field subsequent to TSD manufacture, as described in detail herein.

Figure 2:
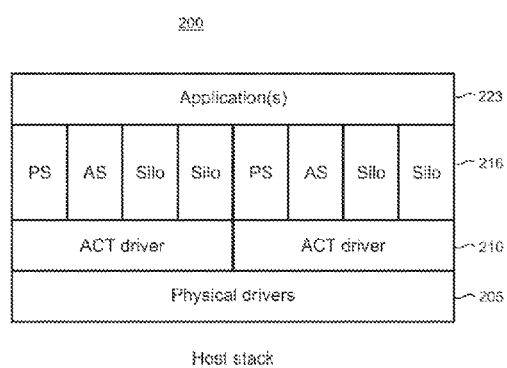
FIG. 2 shows an illustrative IEEE 1667 protocol layer stack for a host device.
Figure 3:
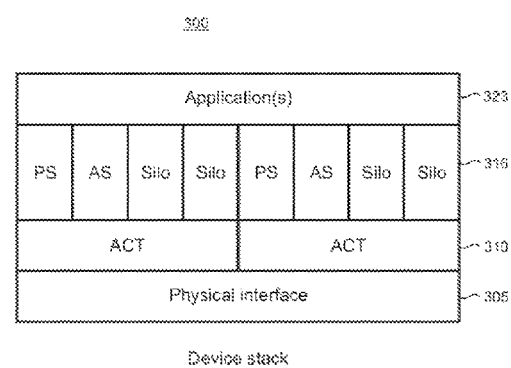
FIG. 3 shows an illustrative IEEE 1667 protocol layer stack for a TSD.

As shown in FIGS. 2 and 3, a TSD 110 and host device 112 will use similar protocol layer stacks 200 and 300 to support IEEE 1667 functionality which may be implemented using firmware, software, or a combination thereof. At the base of host stack 200 is a physical driver layer 205 which can include SCSI (Small Computer System Interface), ATA (Advanced Technology Attachment), or other physical interface that has IEEE 1667 transport defined for it. Above the physical driver layer 205 is the ACT driver layer 210 which represents logical device units (two, in this example). Each ACT is represented as a discrete device on the host 112 and this representation is mirrored on the device stack 300 with the ACT layer 310. Commands that comply with the IEEE 1667 protocol are routed from an ACT driver in the driver layer 210 on the host 112 to a corresponding ACT in the ACT layer 310 in the device 110 via a physical interface layer 305.

Above the ACT layer is the IEEE 1667 layer consisting of silos (indicated by reference numeral 216 on the host stack 200 and reference numeral 316 on the device stack 300). A silo is represented as an index on the TSD 110, and each silo may contain a separate command processing engine and its own private storage for the engine. Respective host and device applications 223 and 323 reside above the silos and use the silos for transport.

A probe silo "PS" and an authentication silo "AS" are provided in each ACT, as shown. The probe silo lets the host query the ACT for its functionality. The probe silo returns the number, types, and versions of the silos implemented in the ACT. The probe silo is mandatory in all ACTs under IEEE 1667 and is always the first to provide a fixed address for the probe action. Execution of the probe action is a precondition for all other actions on any silo.

The authentication silo provides the functions required for bidirectional authentication and administration of the authentication certificates under IEEE 1667. The authentication silo uses certificates to authenticate the host 112 and the ACT and also administers the certificates. IEEE 1667 defines various types of certificates that may be utilized. A mandatory certificate for the manufacturer 140 attests to the TSD's identity. This certificate includes a TSD unique identifier and a public key as part of a PKI key pair that can be used to challenge the TSD.

Figures 4, 5:
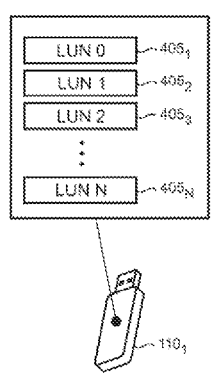
FIG. 4 shows an illustrative set of LUNs on a TSD.
FIG. 5 shows an illustrative table which represents a data structure that is maintained by the device configuration silo for storing configuration data for ACTs/LUNs/silos.

FIG. 4 illustratively shows how a TSD $110_1$ can support multiple LUNs $405_{1, 2 \ldots N}$. However, it is noted that both single LUN and multi-LUN devices can utilize the present device configuration silo. The LUNs 405 on TSD $110_1$ may be provisioned from the manufacturer 140 with initial values in a data structure such as the one shown in table 500 in FIG. 5. The data structure represented by table 500 is maintained by the present device configuration silo to store ACT/LUN/silo configuration data, as described below in more detail.

In the data structure table 500, columns $C_3$ to $C_N$ represent an illustrative set of silos that are configured to be present on the TSD $110_1$ via firmware on the device. The rows in the table 500 represent the various LUNs $405_{1, 2 \ldots N}$ that can be deployed on the TSD $110_1$. As noted above, ACTs have a one-to-one relationship with LUNs. Thus, as shown in row $R_2$, as there is no ACT present on the LUN 1, communication is disabled to the silos on that LUN. The entries in row $R_1$ and $R_N$ show how the various silos on LUN 0 and LUN 2 are provisioned by the manufacturer 140 for this particular TSD $110_1$. Thus, as shown, LUN 2 does not have either the device configuration silo or Silo Y provisioned by the manufacturer 140 when the TSD $110_1$ is released to the field. It should be noted that the manufacturer 140 does not necessarily need to provision a TSD 110 in a manner that is compliant with IEEE 1667. In addition, an authenticated provisioner (i.e., a person who is authorized to can also utilize a device configuration silo to configure a TSD 110 in the field in a non-compliant manner if desired.

Table 500 shows that LUN 0 is provisioned with a device configuration silo. Functionality provided by the device configuration silo is arranged to be supplemental to the functionality provided by the IEEE 1667 silos. The device configuration silo is also IEEE 1667-compatible by being able to accept and utilize the IEEE 1667 command set. However, unlike the other silos which are typically compartmentalized, the device configuration silo is arranged to have access to all the silos on the TSD $110_1$ and can exercise complete control over them.

In order to implement the new functionality provided by the device configuration silo, a functional component is placed between the IEEE 1667 command processor and the available silo functionality on a TSD 110. This is illustrated in FIGS. 6 and 7 which respectively show an existing firmware architecture on an IEEE 1667-compliant TSD 110 and the firmware as modified to implement the present device configuration silo functionality.

Figure 6:
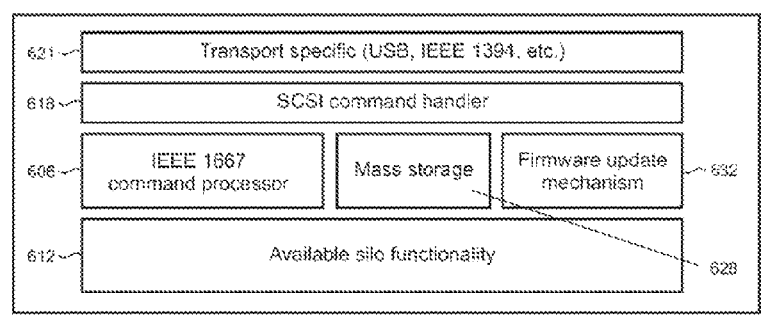
FIG. 6 shows an illustrative firmware architecture that is compliant with IEEE 1667.

As shown in FIG. 6, an IEEE 1667 command processor 606 is arranged to interface with available silo functionality 612 on an ACT in a TSD 110 and expose the functionality through a SCSI command handler 618 and a transport specific component 621 that can implement USB, IEEE 1394-compliant transport, etc. The IEEE 1667 firmware also provides a mass storage component 628 and a firmware update mechanism 632.

Figure 7:
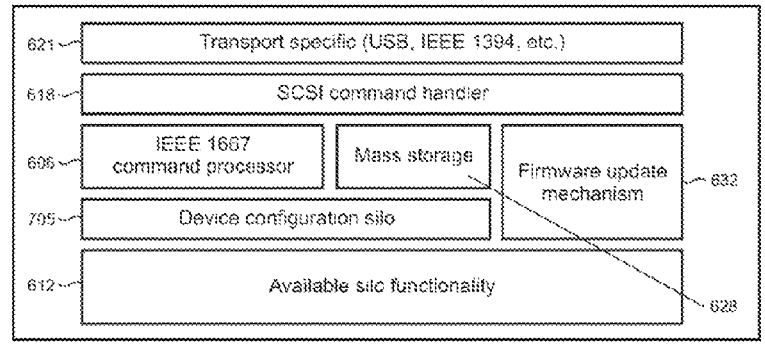
FIG. 7 shows an illustrative firmware architecture as modified to implement device configuration silo functionality as an additional component that is placed between the IEEE 1667 command processor and other silo functionality.
Figure 8:
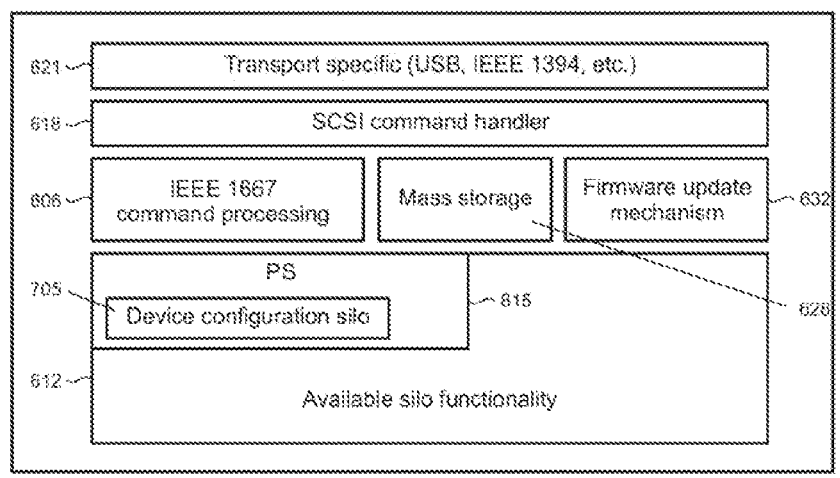
FIG. 8 shows the firmware architecture as modified to implement device configuration silo functionality that is incorporated into a probe silo by extension.

By comparison to the existing IEEE 1667 firmware architecture, as shown in FIG. 7, functionality for the device configuration silo 705 is placed between the IEEE 1667 command processor 606 and the available silo functionality 612. By doing so, the device configuration silo 705 can shape the functionality from the silos that is available to the command processor 606 and exercise control over the silos. As the probe silo is one of these other silos, it may be extended in some implementations so that its functionality will typically never be disabled through a configuration change that is implemented via the device configuration silo 705. Alternatively, as shown in FIG. 8, the probe silo 815 may be extended to directly incorporate the device configuration silo 705. In both such embodiments (i.e., extension of the probe silo or direct incorporation of the device configuration silo into it), in some implementations it may be desirable to explicitly provide the device configuration silo with the capability to disable the probe silo. For example, such capability could be used to provide a field-irreversible way to destroy IEEE 1667 functionality in a TSD. In such a case, once the device configuration silo disables the probe silo, neither silo would be identified upon the next instantiation of the TSD with a host device. The TSD would not be capable of being enabled again without a full firmware update. Various usage scenarios could be supported by such self-destruction behavior including, for example, software trials, licensed-based media content distribution, token-based identity and authentication, secure data transfer, etc.

Figure 9:
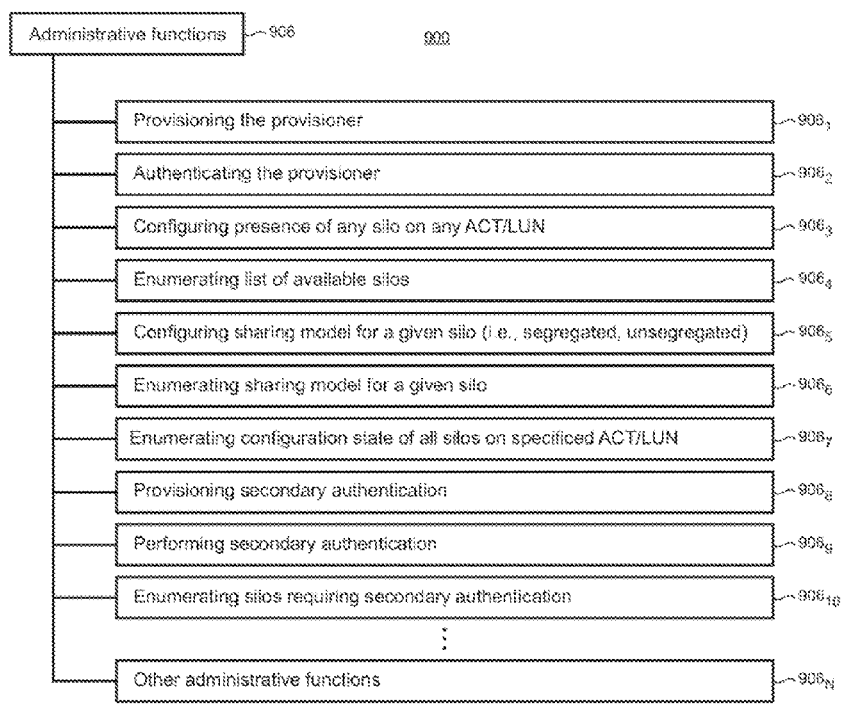
FIG. 9 shows an illustrative taxonomy of administrative functions that may be exposed by interfaces supported by the device configuration silo.

The device configuration silo 705 may expose interfaces to enable various administrative functions to be performed. As shown in taxonomy 900 in FIG. 9, an illustrative set of administrative functions 906 may include provisioning the provisioner $906_1$; authenticating the provisioner $906_2$; configuring the presence of any silo on any ACT/LUN $906_3$; enumerating a list of available silos $906_4$; configuring the sharing model for a given silo $906_5$ (i.e., whether the silo is segregated or unsegregated); enumerating the sharing model of a given silo $906_6$; enumerating the configuration state of all silos on a given ACT/LUN $906_7$; provisioning secondary authentication $906_8$; performing secondary authentication $906_9$; enumerating the silos that require secondary authentication $906_{10}$; and other administrative functions $906_N$. It is emphasized, however, that the functions 906 shown in the taxonomy are intended to be illustrative and not all need to be utilized in every implementation. In addition, administrative functions other than shown in FIG. 9 may also be utilized as may be required to meet the needs of a particular usage scenario. Typically, in many implementations, the interfaces that perform the enumeration functions will not require authentication of the provisioner or user.

The provisioner, in this example, is the IT admin 128 shown in FIG. 1. A TSD 110 can be provisioned so that the IT admin 128 will be provided with administrator privileges for TSD 110 just as might be provided for any other type of IT device that is utilized in the environment 120. The IT admin can be authenticated using unique credentials which can comprise various types, for example, asymmetric key (using the existing PKI cryptographic algorithms that are presently supported by IEEE 1667), symmetric key, password, biometric input, token, or other credentials.

The particular type of authentication credential utilized can vary by implementation and different types can be used when making configuration changes for different silos. However, it can typically be expected that high value functionality, such as that provided by silos that implement a licensed use model, will require the use of more robust methodologies when authenticating the provisioner prior to enabling changes to a silo to be made. In cases where asymmetric key cryptography is used, the appropriate key of the PKI key pair needed for the provisioner to authenticate will typically be provided from the TSD manufacturer, for example, at the same time the TSD 110 is supplied into the field.

When authenticated, the IT admin 128 can work through a host application which executes on the admin console 131 to configure one or more TSDs 110 for users 115 in the enterprise. For example, the IT admin 128 can configure a TSD 110 to change it from its initial state as released by the manufacturer 140, as shown in table 500 in FIG. 5 and described in the accompanying text. Thus, the IT admin 128 could disable the presence of Silo Y on LUN 0, if desired, to name just one example. As the data structure represented by table 500 is maintained by the device configuration silo to track silo configurations, any changes made to the presence of a silo will be updated in the data structure.

The IT admin 128 may also initially configure the sharing model on one or more silos, or make changes to the sharing models that may be initially set by the TSD manufacturer 140. FIG. 10 shows a table 1000 that represents an illustrative data structure that is maintained by the device configuration silo to store data and method sharing configurations on a per-silo basis on a given ACT.

The rows $R_1$, $R_2$, and $R_N$ in table 1000 correspond to the silos which are present on the device. If the column $C_2$ specifies "segregated" then the silo will segregate its associated store of data and/or methods on a per ACT/LUN basis. If "unsegregated" then the same view of data and methods will be exposed regardless of the ACT from which a silo is accessed. As shown, Silos X and Z are segregated, while Silo Y is unsegregated.

When the sharing model implements segregation, for example, it could allow one LUN on a TSD 110 to be utilized for personal use, while another LUN could be utilized for enterprise use by a user 115, without any risk that data could be exposed across such uses. In another example, if each LUN in a multiple-LUN TSD implements an anti-virus functionality, then the set of anti-virus signatures used for virus and other malicious software detection and remediation could be shared across LUNs without segregation. Such sharing would allow the signatures to be effectively utilized across LUNs while simplifying updates to the signatures through use of a single data store.

The IT admin 128 may also provision secondary authentication on one or more silos or make changes to the secondary authentication configuration that is initially provisioned by the manufacturer 140. FIG. 11 shows a table 1100 that provides an illustrative data structure that is maintained by the device configuration silo 705 to determine when secondary authentication may be required to make changes to the presence or sharing model on a silo. Secondary authentication credential types can include, for example, asymmetric key, symmetric key, password, biometric input, token, or other credentials.

The rows in the table 1100 represent various illustrative silos that may be deployed in a given ACT. Column $C_2$ shows the type of secondary authentication credential that will need to be provided to implement a change to a particular silo in this example. While it is emphasized that the secondary authentication credentials can vary by implementation, in this example, Silo X and Silo Y use asymmetric keys. Silo Z uses a password for a secondary authentication. Silo Q does not require any secondary authentication credential. That means that the functionality provided by Silo Q can be freely used. The IT admin 128 may decide whether to configure its presence on a LUN, but once present there are no other restrictions on its usage.

Column $C_3$ shows illustrative values that indicate whether a single use of a secondary authentication credential fully enables the functionality provided by a silo. If enabled, the secondary authentication credentials are persisted so that silo is essentially unlocked for all subsequent configuration changes. If a silo is not enabled, then a secondary authentication credential will not be persisted and will need to be provided with each and every subsequent configuration change that is made to the silo. As shown, all silos are enabled in this illustrative example except for Silo Y.

The uses of secondary authentication can vary by implementation. However, secondary authentication may typically be utilized to control how a user 115 makes changes or gains access to a silo during runtime after a TSD 110 is deployed in the field. For example, secondary authentication credentials could be used to activate functionality that is pre-loaded by the manufacturer 140 in a silo but where the silo's presence on an ACT/LUN is not enabled. Thus, if the functionality is an application or piece of media content that requires a license to use, the user 115 could obtain a license key, activation code, product code, or similar construct that could be used as a secondary authentication credential.

The authentication credential will typically be utilized as part of a PKI asymmetric key system in this case to provide enhanced security for the high value licensed functionality in the silo. Accordingly, Silo X and Silo Y in FIG. 11 could contain licensed functionality since the table 1100 indicates that the secondary authentication credential uses asymmetric keys.

Figure 12:
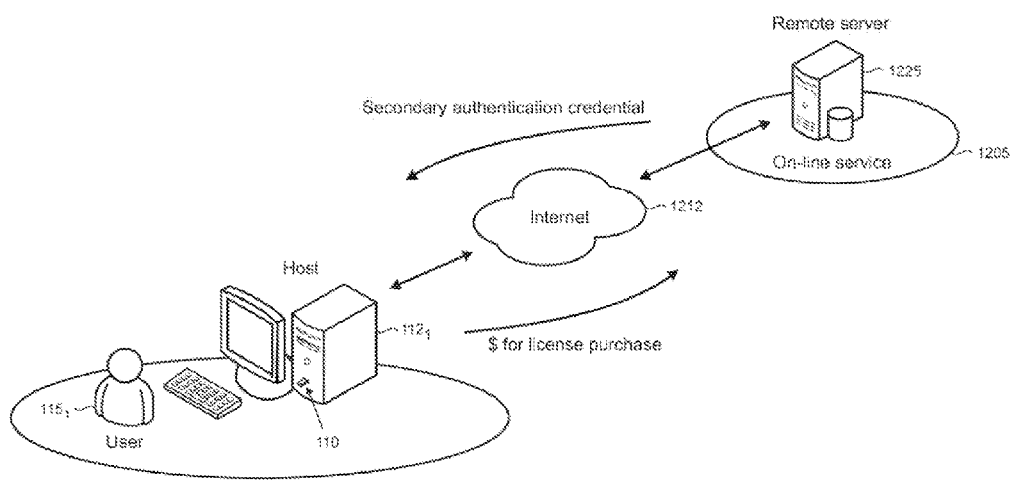
FIG. 12 shows an illustrative arrangement by which a host device interacts with a remote server at an on-line service to obtain a license and secondary authentication credential.

The license and associated secondary authentication credentials needed to enable and use the functionality of a particular licensed silo can be obtained in a variety of different ways. As shown in FIG. 12, the license can be obtained via a transaction between a host device $112_1$ and an on-line service 1205 over a network such as the Internet 1212. Here, for example, a secure channel can be set up to a remote server 1225 and the user $115_1$ can complete a transaction to purchase or renew a license to use the functionality provided by the silo in the TSD 110. The remote server 1225 can then pass the secondary authentication credential in the form of a license key or product code, for example, to the host device $112_1$.

In some cases, the user 115 does not even need to see or handle the secondary authentication credential as the host application on the host device $112_1$ can pass the credential directly to the device configuration silo to thereby enable the licensed silo and make the functionality available to the user. For example, a group of silos on the TSD may contain a respective sequence of episodes of a television program that the user $115_1$ can purchase and view on a per-episode basis. Various licensed usage scenarios can be implemented to control the number of times that functionality may be accessed, the amount of time the functionality is made available, and the like.

Figure 13:
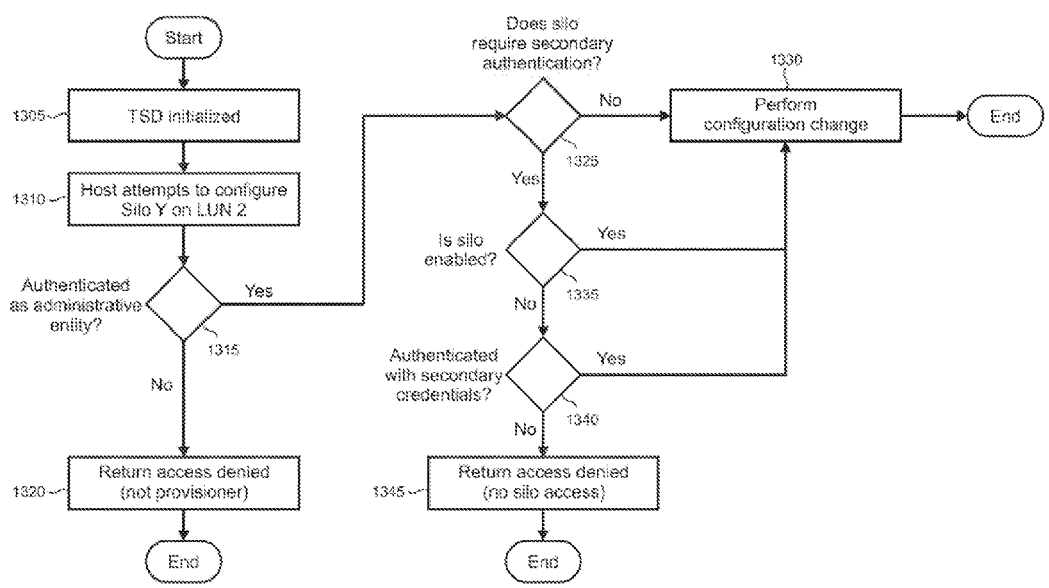
FIG. 13 is a flowchart that provides an illustrative logic flow used to implement a configuration change to a silo.

FIG. 13 is a flowchart that provides an illustrative logic flow used to implement a configuration change to a silo. In this example, the TSD 110 has three LUNs as shown in table 500 in FIG. 5. The logic flow starts at block 1305 where the TSD is initialized with the configuration values from the manufacturer 140 in table 500. At block 1310, an attempt is made by an individual through the host application to configure Silo Y on LUN 2 of the TSD 110.

At the decision block 1315, if the individual (e.g., the IT admin 128 shown in FIG. 1) attempting the configuration change is not successfully authenticated as the provisioner, then an access denied result (not provisioner) will be returned at block 1320, and the logic flow will end. If the individual making the attempt supplies the correct authentication credential and is authenticated as the provisioner, then control passes to decision block 1325 where the device configuration silo will check the secondary authentication provisioning table 1100 shown in FIG. 11 to determine if secondary authentication is required before changes can be made to Silo Y. As shown in table 1100, secondary authentication is required in this example using an asymmetric key. If secondary authentication were not required, then the device configuration silo would perform the configuration change at block 1330 and the logic flow would end.

When secondary authentication is required, then control passes to decision block 1335 where it is determined if the silo is enabled. If a previous secondary authentication has been persisted, then the silo is enabled so that repeated configuration changes can be made without additional authentication. In this example, as shown in table 1100, Silo Y is enabled which means that a previous successful secondary authentication is persisted by the device configuration silo for subsequent configuration changes. In this case, control passes to block 1330 where the desired configuration change is made and the logic flow ends.

If Silo Y had not been enabled in table 1100, then control would pass to decision block 1340 where secondary authentication is determined. If the host application provides the proper secondary authentication credential to authenticate the individual, then control is passed to block 1330 where the desired configuration change is made and the logic flow ends. If the secondary authentication is not successful, then an access denied result (i.e., no silo access) will be returned at block 1345 and the logic flow ends.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-readable storage manufacture comprising a storage device that includes a plurality of silos including a configuration silo, where the storage device is Institute of Electrical And Electronic Engineers (IEEE) 1667-compliant, the storage device configured for performing actions comprising:
   exposing, by the storage device, an interface of the configuration silo, where the configuration silo is configured for accessing the silos and is further configured for exercising control over the silos; and
   configuring, by the storage device via the exposed interface, a sharing model of the storage device, where the sharing model controls segregation and un-segregation of each of the silos.

2. The computer-readable storage manufacture of claim 1 where the interface is configured for enabling a provisioner to perform configuration changes to the silos, or for setting an authentication mechanism and a secondary authentication mechanism.

3. The computer-readable storage manufacture of claim 2 where the performed configuration changes are performed at a runtime.

4. The computer-readable storage manufacture of claim 2 where the performed configuration changes are performed by the administrator based on authentication of the provisioner.

5. The computer-readable storage manufacture of claim 1 where the configuration silo is implemented on at least ne addressable command target ("ACT") of the storage device.

6. The computer-readable storage manufacture of claim 1 where the interface is configured for setting a sharing model in which one of the silos is segregated so that the one of the silos will store data on a per-addressable command target ("ACT") basis.

7. The computer-readable storage manufacture of claim 1 where the interface is configured for setting a sharing model in which one of the silos is unsegregated so that a common view of data is exposed regardless of from which addressable command target ("ACT") the one of the silos is accessed.

8. A method of operating a computer-readable storage manufacture comprising a storage device that includes a plurality of silos including a configuration silo, where the storage device is Institute of Electrical And Electronic Engineers (IEEE) 1667-compliant, the method comprising:
exposing, by the storage device, an interface of the configuration silo, where the configuration silo is configured for accessing the silos and is further configured for exercising control over the silos; and
configuring, by the storage device via the exposed interface, a sharing model of the storage device, where the sharing model controls segregation and un-segregation of each of the silos.

9. The method of claim 8 where the interface is configured for enabling a provisioner to perform configuration changes to the silos, or for setting an authentication mechanism and a secondary authentication mechanism.

10. The method of claim 9 where the performed configuration changes are performed at a runtime.

11. The method of claim 9 where the performed configuration changes are performed by the administrator based on authentication of the provisioner.

12. The method of claim 8 where the configuration silo is implemented on at least one addressable command target ("ACT") of the storage device.

13. The method of claim 8 where the interface is configured for setting a sharing model in which one of the silos is segregated so that the one of the silos will store data on a per-addressable command target ("ACT") basis.

14. The method of claim 8 where the interface is configured for setting a sharing model in which one of the silos is unsegregated so that a common view of data is exposed regardless of from which addressable command target ("ACT") the one of the silos is accessed.

15. A computer-readable storage manufacture storing instructions that, when executed by a processor of a storage device of the computer-readable storage manufacture, cause the storage device to perform actions, the storage device including a plurality of silos including a configuration silo, where the storage device is Institute of Electrical And Electronic Engineers (IEEE) 1667-compliant, the actions comprising:
exposing, by the storage device, an interface of the configuration silo, where the configuration silo is configured for accessing the silos and is further configured for exercising control over the silos; and
configuring, by the storage device via the exposed interface, a sharing model of the storage device, where the sharing model controls segregation and un-segregation of each of the silos.

16. The computer-readable storage manufacture of claim 15 where the interface is configured for enabling a provisioner to perform configuration changes to the silos, or for setting an authentication mechanism and a secondary authentication mechanism.

17. The computer-readable storage manufacture of claim 15 where the data and methods of a segregated silo are segregated to a particular addressable command target (ACT).

18. The computer-readable storage manufacture of claim 16 where the performed configuration changes are performed by the administrator based on authentication of the provisioner.

19. The computer-readable storage manufacture of claim 16 where the configuration silo is implemented on at least one addressable command target ("ACT") of the storage device.

20. The computer-readable storage manufacture of claim 16 where the interface is configured for setting a sharing model in which one of the silos is segregated so that the one of the silos will store data on a per-addressable command target ("ACT") basis, or where the interface is configured for setting a sharing model in which one of the silos is unsegregated so that a common view of data is exposed regardless of from which addressable command target ("ACT") the one of the silos is accessed.

* * * * *